(12) United States Patent
Frey et al.

(10) Patent No.: US 11,310,342 B1
(45) Date of Patent: Apr. 19, 2022

(54) SYSTEMS AND METHODS FOR OPTIMIZING A SOFTWARE ALLOCATION TO SHARED RESOURCES BASED ON A DYNAMIC MAPPING OF RESOURCE RELATIONSHIPS

(71) Applicant: CTRL IQ, Inc., Albany, CA (US)

(72) Inventors: John Frey, Sammamish, WA (US); Cedric Clerget, Ormenans (FR); Ian Kaneshiro, East Lansing, MI (US)

(73) Assignee: CTRL IQ, Inc., Albany, CA (US)

( * ) Notice: Subject to any disclaimer, the term of this patent is extended or adjusted under 35 U.S.C. 154(b) by 0 days.

(21) Appl. No.: 17/508,131

(22) Filed: Oct. 22, 2021

(51) Int. Cl.
| | | |
|---|---|---|
| H04L 67/63 | (2022.01) | |
| H04L 67/75 | (2022.01) | |
| H04L 67/00 | (2022.01) | |

(52) U.S. Cl.
CPC ............ H04L 67/327 (2013.01); H04L 67/34 (2013.01); H04L 67/36 (2013.01)

(58) Field of Classification Search
CPC ........ H04L 67/327; H04L 67/34; H04L 67/36
See application file for complete search history.

(56) References Cited

U.S. PATENT DOCUMENTS

| | | | | |
|---|---|---|---|---|
| 9,336,030 B1* | 5/2016 | Marr | .................... | G06F 9/5077 |
| 9,557,792 B1* | 1/2017 | Potlapally | ............. | G06F 1/3206 |
| 9,582,377 B1* | 2/2017 | Dhoolam | .............. | G06F 9/5011 |
| 9,727,379 B1* | 8/2017 | Wilkes | .................. | G06F 9/5005 |
| 10,048,996 B1* | 8/2018 | Bell | ..................... | G06F 11/3006 |
| 10,097,372 B2* | 10/2018 | Bhattacharya | ........ | H04L 45/745 |
| 10,831,251 B1* | 11/2020 | Ross | ......................... | G06F 1/26 |
| 10,929,797 B1* | 2/2021 | Gupta | ................... | H04L 47/728 |
| 11,048,311 B1* | 6/2021 | Churnock | ................ | G06F 1/28 |
| 11,086,521 B2* | 8/2021 | Frank | ...................... | G06F 3/061 |
| 11,157,057 B1* | 10/2021 | Maillot | .................. | G01R 31/40 |
| 2009/0187915 A1* | 7/2009 | Chew | ..................... | G06F 9/5044 |
| | | | | 718/104 |
| 2013/0263117 A1* | 10/2013 | Konik | ................. | G06F 9/45558 |
| | | | | 718/1 |
| 2014/0304357 A1* | 10/2014 | Bestler | .................... | G06F 16/27 |
| | | | | 709/213 |
| 2015/0039847 A1* | 2/2015 | Modzelewski | ....... | G06F 3/0604 |
| | | | | 711/162 |
| 2016/0224373 A1* | 8/2016 | Harris | .................... | G06F 9/5027 |

(Continued)

Primary Examiner — Blake J Rubin
(74) Attorney, Agent, or Firm — Ansari Katiraei LLP; Arman Katiraei; Sadiq Ansari (57) ABSTRACT

A controller is provided to optimize software allocations to shared resources based on a dynamic mapping of resource relationships. The controller may map relationships between resources of nodes in different compute clusters. The controller may receive a request for a particular application, and may determine different sets of the nodes that each include minimum, desired, purchased, or subscribed to set of resources to run the particular application. The controller may determine optimization constraints associated with running the particular application, and may compare the relationships between the resources of each set of nodes to the optimization constraints. The controller may select a particular set of nodes that have resource relationships satisfying more of the optimization constraints than the resource relationships of other selected sets of nodes, and may execute the particular application using the resources of the particular set of nodes.

24 Claims, 6 Drawing Sheets

(56) References Cited

U.S. PATENT DOCUMENTS

| | | |
|---|---|---|
| 2016/0359705 A1* | 12/2016 | Parandehgheibi .... G06F 16/288 |
| 2017/0117940 A1* | 4/2017 | Cafe ...................... H04B 3/544 |
| 2020/0042068 A1* | 2/2020 | Rong ..................... G06F 1/3209 |
| 2020/0136943 A1* | 4/2020 | Ban ......................... H04L 43/08 |
| 2020/0311559 A1* | 10/2020 | Chattopadhyay ........ G06N 5/04 |
| 2021/0019196 A1* | 1/2021 | Geffin ................... G06F 9/5027 |
| 2021/0273996 A1* | 9/2021 | Srikanthan .......... H04L 67/1097 |

* cited by examiner

FIG. 6

SYSTEMS AND METHODS FOR OPTIMIZING A SOFTWARE ALLOCATION TO SHARED RESOURCES BASED ON A DYNAMIC MAPPING OF RESOURCE RELATIONSHIPS

BACKGROUND

"Cloud" computing and/or hosted computing may involve allocating different sets of resources from different compute nodes to run different applications, services, and/or software. A user may specify the resources for running a particular application. An orchestrator that manages the resource allocation may receive a request for the particular application resources, and may identify and allocate the requested resources wherever they are found to be available in the compute nodes without regard for performance, reliability, security, efficiency, and/or other runtime considerations associated with the resource allocation for that particular application. Consequently, the allocated resources may be spread across different sites, racks, systems, machines, and/or other distributed nodes. Such an allocation may introduce latency, reliability issues, security issues, and/or overhead for any data that is exchanged between the resources that are allocated from the different nodes.

DETAILED DESCRIPTION OF PREFERRED EMBODIMENTS

The following detailed description refers to the accompanying drawings. The same reference numbers in different drawings may identify the same or similar elements.

Disclosed are systems and methods for optimizing software allocations to shared resources based on a dynamic mapping of resource relationships. In some embodiments, the software allocation optimization include identifying different sets of nodes within one or more managed hardware clusters that contain a desired set of resources for running a particular application, and deploying the software components of the particular application to a particular set of nodes from the different sets of nodes with node or resource relationships that satisfy all or the greatest amount of optimization constraints that are defined for the particular application, the particular application requestor, and/or the nodes running different applications. More specifically, the systems and methods may include performing an intelligent allocation of software to different resources of one or more compute nodes based on mapped and/or modeled relationships between the compute node resources and the impact that those relationships have on performance, reliability, security, cost, efficiency, and/or other runtime considerations specified for the deployed software, the software requestor, and/or the nodes used to run different software of different requestors.

In some embodiments, the resource relationship mapping and/or modeling may include detecting the resources that may be allocated from each node in one or more managed hardware clusters, and mapping the physical positioning, connections, networking, power domains, other physical relationships and/or logical relationships between the nodes and/or the detected node resources. The resource relationship mapping and/or modeling may further include generating one or more graphs that arrange the nodes and/or the node resources based on the different discovered relationships.

In some embodiments, optimizing the software-to-resource allocation for one or more performance constraints may include traversing one or more of the graphs to identify and/or select a particular resource allocation for a particular application that satisfies the resource requirements of the particular application, and that also maximizes performance of the particular application by minimizing latency, inter-node communication, distance between interoperating resources, and/or other node or resource relationships that may impact application performance. In some embodiments, optimizing the software-to-resource allocation for one or more reliability constraints may include traversing one or more of the graphs to identify and/or select a particular resource allocation that satisfies the resource requirements for the particular application, and that also maximizes application reliability by referencing the mapping to deploy different instances and/or software components of the particular application to different failure domains such that a single hardware failure or attack at one location does not disrupt the execution of the particular application elsewhere.

Figure 1:
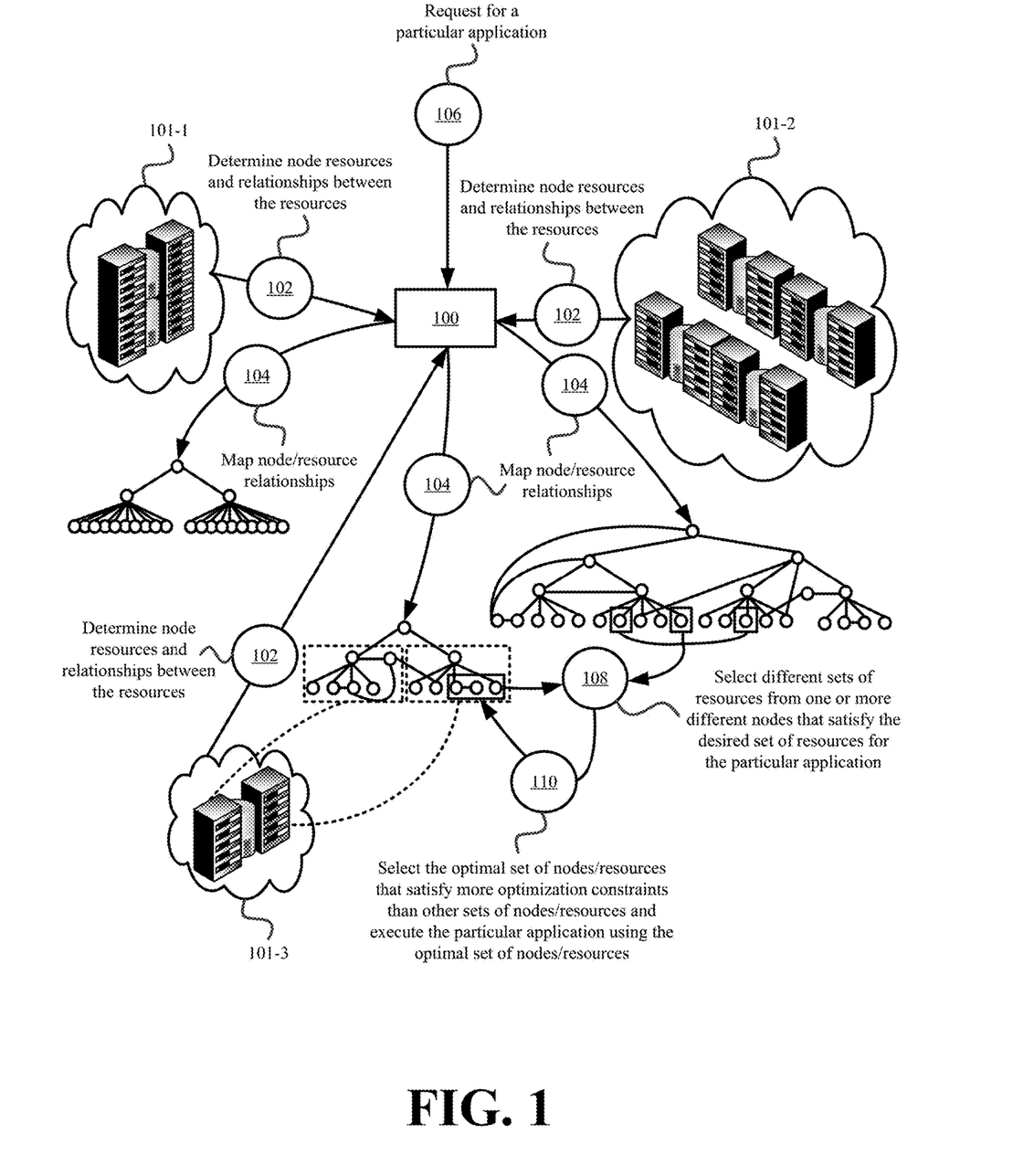
FIG. 1 illustrates an example of optimizing the allocation of software to node resources based on a dynamic mapping of the node resource relationships in accordance with some embodiments presented herein.

FIG. 1 illustrates an example of optimizing the allocation of software to node resources based on a dynamic mapping of the node resource relationships in accordance with some embodiments presented herein. FIG. 1 includes controller 100 that manages the allocation of resources from different node clusters 101-1, 101-2, and 101-3 (hereinafter sometimes collectively referred to as "node clusters 101" or individually as "node cluster 101").

Each node cluster 101 may correspond to a site or location with multiple nodes. Each node may correspond to a server, device, and/or other machine with a set of resources that may be allocated by controller 100 for execution of different applications, services, and/or software from one or more users. The resources may include different numbers of processor cores, processor architectures (e.g., Complex Instruction Set Computer ("CISC") or x86, Reduced Instruction Set Computer ("RISC") or Advanced RISC Machines ("ARM"), etc.), logic circuits (e.g., Graphic Processing Units ("GPUs"), specialized neural network processors, Application-Specific Integrated Circuits ("ASICs"), Field-Programmable Gate Array ("FPGA"), etc.), memory, communication buses, network fabrics and/or interfaces, and/or other components that the applications, services, and/or software may use to execute and/or perform different tasks. Different resources may be associated with different performance, reliability, cost, security, efficiency, and/or other parameters. For instance, a first Double Data Rate ("DDR") Random Access Memory ("RAM") module (e.g., a DDR5 module) may be associated with a first performance parameter that is faster than a second performance parameter of a second DDR RAM module (e.g., a DDR3 module).

The nodes within each node cluster 101 may be arranged in groups and/or racks that are powered by one or more power domains, that are networked via one or more network equipment (e.g., switches, routers, hubs, etc.), that are connected using one or more network fabrics or interfaces (e.g., Ethernet, Infiniband, etc.), that communicate over one or more buses, that have resources arranged in one or more Non-Uniform Memory Access ("NUMA") domains, and/or that are operated or accessed via other means. Accordingly, the nodes may not include a uniform set of hardware with a uniform set of resources.

Controller 100 may dynamically discover different physical and/or logical relationships between the resources of the different nodes within each node cluster 101 and/or different physical and/or logical relationships between the nodes. More specifically, controller 100 may determine how the performance, reliability, security, cost, efficiency, and/or other parameters are affected when two or more resources from the same node or different nodes are used to execute software and/or perform one or more tasks.

As shown in FIG. 1, controller 100 may query each node cluster 101 to determine (at 102) the resources available at each node and the relationships between the resources. Each node may run a controller agent. The controller agent running on a particular node may manage the resources of the particular node. Specifically, the controller agent may discover the resources available on a corresponding node, may notify controller 100 of the available resources (via one or more network messages exchanged with controller 100), and may allocate different sets of the resources for different applications according to instructions provided by controller 100.

In some embodiments, controller 100 may communicate with other equipment or services in each node cluster 101 in order to map other resource relationships between nodes and/or resources in a node cluster 101. For instance, controller 100 may interface and/or communicate with Power Distribution Units ("PDUs") within each node cluster 101 in order to remotely monitor and/or control the power that is supplied to different nodes. Based on the data collected from the PDUs, controller 100 may map the nodes to different power domains or failure domains. Similarly, controller 100 may interface and/or communicate with serial concentrators, switches, and/or other networking equipment within each node cluster 101, rack, and/or other grouping of nodes to determine how the nodes are connected to one another via different network equipment. For instance, controller 100 may derive the physical positioning of each node relative to other nodes based on address tables of the networking equipment, traceroutes, and/or other network discovery performed by the controller agents. Based on the data collected from the networking equipment, controller 100 may determine network fabric and/or interface relationships (e.g., which nodes have InfiniBand, Ethernet, and/or other network interfaces), latency and/or other network performance relationships, network failure domain relationships, and/or other relationships between the nodes and/or node resources.

Controller 100 may generate (at 104) one or more graphs to map and/or model the relationships detected between nodes and/or node resources in each node cluster 101. The graphs may be dynamically generated and/or updated as different information is detected from the controller agents and/or other remotely accessible devices within node clusters 101. Each graph may map one or more different relationships. For instance, a first graph for node cluster 101-1 may map the physical locations and/or connectivity of each node in node cluster 101-1, a second graph for node cluster 101-1 may map the different power or failure domains that each node in node cluster 101-1 is powered by or connected to, and a third graph for node cluster 101-1 may map the closest number of processor cores to each GPU within node cluster 101-1. A multi-relationship graph may model each of the relationships within the first graph, the second graph, and the third graph in a single graph with links representing different relationships between different resources and/or nodes. Accordingly, the graphs may identify different relationships between a particular resource and/or different relationships between different combinations of resources.

Controller 100 may receive (at 106) a request to execute a particular application, service, and/or software using the resources from one or more nodes within node clusters 101. In some embodiments, the request may include a resource definition.

The resource definition may enumerate a minimum set of resources to run the particular application, service, and/or software, and/or may enumerate a preferred set of resources to run the particular application, service, and/or software. For instance, the resource definition may specify running the particular application on 4 cores of a particular x86 processor (e.g., Intel® $10^{th}$ generation i7 processor), a GPU that supports DirectX 12 features, 128 gigabytes of RAM with a certain minimum frequency, and/or 200 Megabits per second ("Mbps") of network bandwidth provided by an InfiniBand or fiberoptic network connection.

In some embodiments, the request may be issued without a resource definition. In some such embodiments, controller 100 may provide a default set of resources based on a usage plan subscribed to or purchased by the user issuing the request, and may dynamically scale the resources as needed should demand for the particular application saturate the default set of resources or cause usage of the default set of resources to exceed one or more thresholds. Similarly, controller 100 may dynamically reduce the default set of resources if the resources are underutilized during execution of the particular application.

Controller 100 may traverse the relationship graphs in order to identify an optimal set of resources for the particular application, service, and/or software. Traversing the relationship graphs may include selecting (at 108) different sets of resources from one or more nodes that satisfy the resource definition and/or desired set of resources for the particular application, service, and/or software. For instance, as shown in FIG. 1, controller 100 may select (at 108) three nodes from two different racks in node cluster 101-2, and three nodes from the same rack in node cluster 101-3 that satisfy the resource definition and/or desired set of resources for the particular application, service, and/or software. Controller 100 may filter the selected sets of resources to identify the optimal set of resources that satisfy optimization criteria associated with deploying the particular application, service, and/or software across node clusters 101.

In some embodiments, the optimization criteria may include determining the set of resources that execute the particular application, service, and/or software with the least latency, the least inter-node communication, that match or are most similar to the resources enumerated within the resource definition, and/or that otherwise improve execution performance of the particular application, service, and/or software without a greater allocation of resources. For example, the resource definition may request 32 processor cores. The relationship graphs may identify that the first selected set of resources/nodes (e.g., three nodes from two racks in node cluster 101-2) include one node in a first rack with a 16-core processor and two nodes in the second rack with 8-core processors with the two racks interconnected by network switches, and may identify that the second selected set of resources/nodes (e.g., three nodes from one rack in node cluster 101-3) include two nodes in the same rack with 16-core processors, a third node in the same rack with an 8-core processor, and with the three nodes being connected on the same communication bus. In this example, controller 100 may select the second set of resources/nodes over the first set of resources/nodes based on the relationships between the second set of resources/nodes indicating lower latency as a result of the inter-processor communication being retained on the common bus rather than having to traverse different network links, different racks, and/or different network equipment.

In some embodiments, the optimization criteria may include selecting the set of resources/nodes that maximize the uptime and/or reliability of the particular application, service, and/or software. In some such embodiments, selecting the optimal set of resources/nodes may include selecting redundant and/or backup resources for the particular application, service, and/or software. For instance, controller 100 may select a first set of resources from a first set of nodes and a second set of resources from a second set of nodes that allow the particular application, service, and/or software to continue running even if a particular power domain, rack, site, and/or region becomes inaccessible. Selecting the set of resources/nodes that maximize reliability may include selecting resources from nodes that contain more reliable hardware and/or that are connected via more reliable network equipment or paths (e.g., selecting a first node with memory from a first more-reliable vendor than memory on a second node that is from a second less-reliable vendor, selecting a first node that is connected to a faster performing network switch and that has an external network path provided by a first more-reliable transit provider over a second node that is connected to a slower performing network switch and that has an external network path provided by a second less-reliable transit provider, etc.). In some embodiments, the relationship graphs may identify the nodes that most frequently receive attack traffic and/or that have experienced the most failures, and controller 100 may select resources from nodes that receive the least amount of attack traffic and/or experience the least failures in order to satisfy the reliability constraint.

In some embodiments, the optimization criteria may be defined based on cost, security, efficiency, and/or other resource and/or node relationships mapped by controller 100. In any case, controller 100 may reference the relationship graphs to identify the nodes that provide the desired resources and that have the node or resource relationships that satisfy more of the optimization criteria than other nodes or resources.

As shown in FIG. 1, controller 100 may select (at 110) the three nodes from the same rack in node cluster 101-3 as the optimal set of resources. Selecting (at 110) the optimal set of resources may include controller 100 sending resource reservation requests to the controller agent on each of the three nodes in node cluster 101-3 in order to reserve the optimal set of resources from those nodes for the particular application, service, and/or software, and/or deploying the particular application, service, and/or software to the controller agents and/or nodes. The controller agents may install, configure, and/or execute the particular application, service, and/or software using the optimal set of resources allocated from the three nodes in node cluster 101-3.

Figure 2:
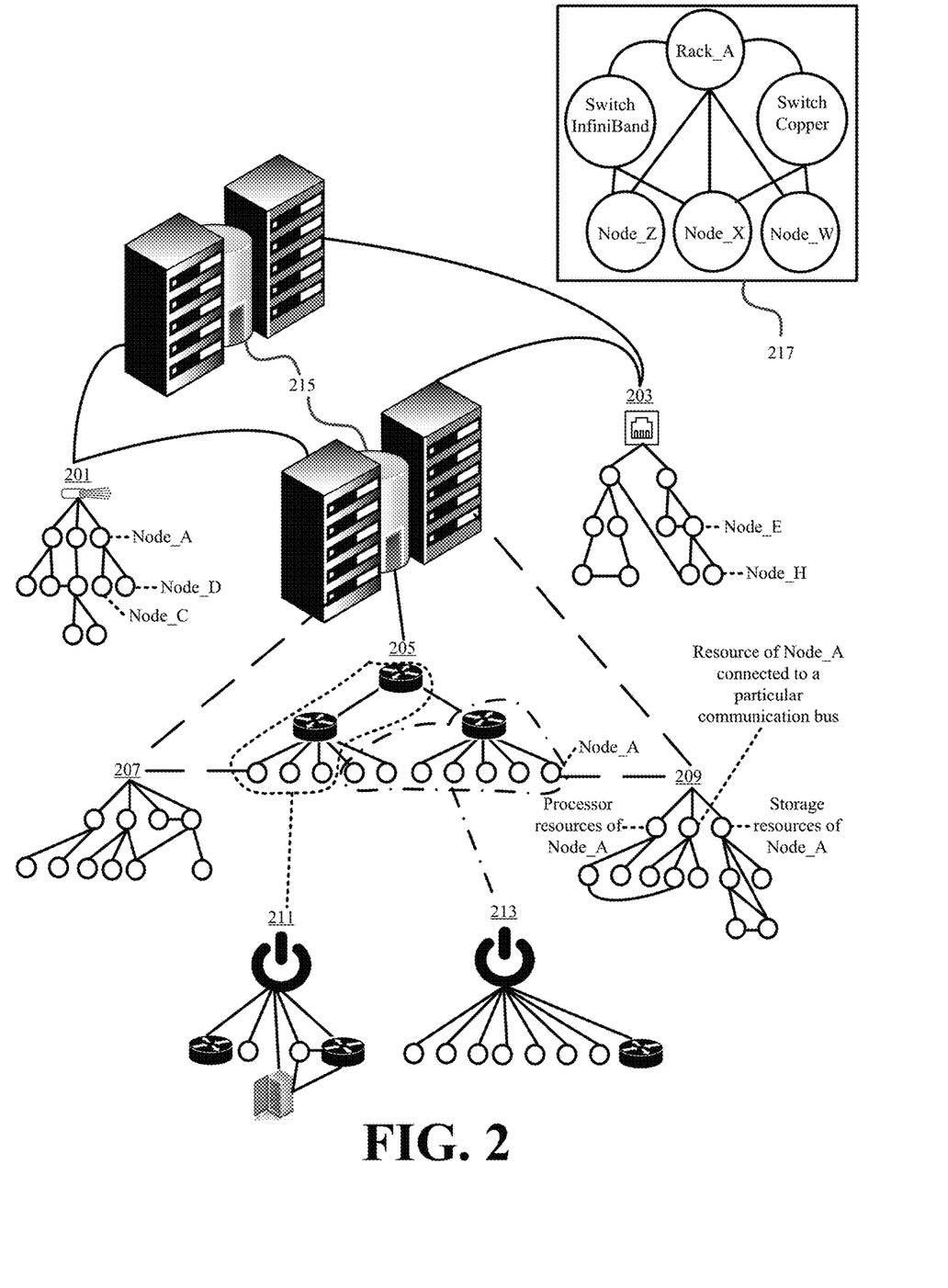
FIG. 2 illustrates a relationship graph generation example in accordance with some embodiments presented herein.

FIG. 2 illustrates a relationship graph generation example in accordance with some embodiments presented herein. In particular, FIG. 2 illustrates different graphs 201, 203, 205, 207, 209, 211, and 213 that controller 100 may generate to model different relationships that are detected amongst resources and/or nodes of node cluster 215.

Controller 100 may detect the relationships by querying controller agents running on the nodes, other remotely accessible devices that control the power, routing, connectivity, and/or communication between the nodes, and/or tools for measuring or identifying different relationships. For instance, a ping tool may be used to determine the communication latency between different pairs of nodes, and controller 100 may map the physical location of each node based on the latency that is detected between the different pairs of nodes.

Relationship graph 201 may map InfiniBand connectivity between different nodes in the same or different node clusters, and relationship graph 203 may map Ethernet connectivity between different nodes in the same or different node clusters. In some embodiments, each element within relationship graphs 201 and 203 may specify a unique identifier of a compute node represented by that element. The unique identifier may include the Media Access Control ("MAC") address of the node, an Internet Protocol ("IP") address for the controller agent of the node, and/or another value for uniquely identifying each node or controller agent. The vertices in relationship graphs 201 and 203 may model how the nodes are connected to one another.

Controller 100 may generate relationship graphs 201 and 203 by accessing networking equipment (e.g., a network switch, router, serial concentrator, etc.) that connects the nodes, querying an address table of the networking equipment to identify which nodes are connected to the same networking equipment and/or to identify the type of connection (e.g., InfiniBand, Ethernet, and/or another) between the networking equipment and each node.

Relationship graph 205 may map the physical location of each node in node cluster 215. Each element of relationship graph 205 may specify the unique identifier of the node represented by that element and/or a positional identifier that identifies the physical location or relative position of the represented node in node cluster 215.

In some embodiments, controller 100 may derive the physical location of each node by remotely accessing networking equipment in each rack (e.g., a network switch, router, serial concentrator, etc.), and by determining which nodes are connected to that networking equipment. Controller 100 may assume that any nodes connected to a switch of a particular rack are physically located in that rack. In some embodiments, a port mapping may be used to determine the physical location of each node in the rack. For instance, the node that is connected to the first port of the networking equipment may be located in a first slot or location of the rack, and the node that is connected to the second port of the networking equipment may be located in a second slot or location of the rack. Not all racks may be connected in the same manner. Accordingly, in some embodiments, controller 100 may use tools (e.g., ping, traceroute, etc.) to measure the distance separating the nodes from each other and/or the networking equipment in order to pinpoint their physical or relative locations to one another.

Relationship graphs 207 and 209 may map the resources of two different nodes in node cluster 215. In some embodiments, a similar relationship graph may be generated for each particular node to include the detected resources that a controller agent running on the particular node detects, manages, and/or reports to controller 100. For instance, relationship graph 207 may enumerate a first set of processors, memory, storage, network, and/or other resources of a first node that may be allocated and/or used to run one or more applications, and relationship graph 209 may enumerate a second set processors, memory, storage, network, and/or other resources of a second node that may be allocated and/or used to run the same or different applications. The enumeration may identify the make, model, version, and/or other attributes of specific resources (e.g., solid-state storage versus magnetic disk storage, DDR5 memory versus DDR4 memory, network connection interface, number of processor cores, processor architecture, etc.), resource performance characteristics (e.g., read and write rates for different storage devices, memory, or network connections, frame rate rendering performance, etc.), and/or other parameters that may impact resource allocation. The root element of each graph 207 and 209 may specify the unique identifier of the node represented by the graph and the children elements may identify the different resources of the represented node.

In some embodiments, relationship graph 207 may also identify relationships between the resources detected on the respective node. For instance, relationship graph 207 may identify sockets and/or buses that connect different resources to one another (e.g., whether a resource is connected to a Peripheral Component Interconnect Express ("PCI-E"), Serial AT Attachment ("SATA"), Small Computer System Interface ("SCSI"), and/or other buses). Relationship graph 207 may also identify resources in the same NUMA domain, resources that are directly connected or remotely accessed over a network, and/or other such relationships between different sets of resources identified on a single node or multiple nodes.

Relationship graphs 211 and 213 may map different power domains or failure domains that different nodes and/or other devices in node cluster 215 are connected to. Specifically, relationship graphs 211 and 213 may identify which nodes will be affected by different failures occurring within or outside the node cluster. For instance, the mapping of a first failure domain (e.g., relationship graph 211) may identify which nodes will be affected should an entire rack fail, the mapping of a second failure domain (e.g., relationship graph 213) may identify which nodes will be affected should a particular networking device that is connected to multiple racks fail, the mapping of a third failure domain may identify which nodes will be affected should an entire node cluster fail (due to a power outage or network disruption), and the mapping of a fourth failure domain may identify which nodes will be affected should a regional outage occur (e.g., a state-wide blackout or network disruption occur).

In some embodiments, relationship graphs 211 and 213 may be organized to represent the different failure domains. For instance, the children elements of relationship graph 211 that indirectly connect or lead to a first tier may represent the nodes that will be affected by a regional and/or site failure, the children elements that indirectly connect or lead to a lower second tier may represent the nodes that will be affected by a failure of a power supply that supplies power to a set of racks in node cluster 215, and the children elements that indirectly and/or directly connect or lead to a third tier that is below the second tier may represent the nodes that will be affected by a failure of a particular rack in the set of racks.

In some embodiments, controller 100 may generate relationship graphs 211 and 213 by remotely accessing different PDUs that control power to different node clusters, racks, nodes, and/or other devices in a node cluster, and by controlling the PDUs (e.g., turning on and off different power outputs) to test which nodes are affected when power from different outputs of the various PDUs are affected. In some embodiments, controller 100 may generate relationship graphs 211 and 213 by remotely accessing different networking equipment that connect the nodes together, and by controlling the ports (e.g., enabling and disabling the communication flow on different ports) to test which nodes are affected when different network ports and/or connections are disabled.

In some embodiments, controller 100 may combine the relationships modeled within two or more of relationship graphs 201, 203, 205, 207, 209, 211, 213, and/or other graphs to generate multi-relationship graph 217. For instance, multi-relationship graph 217 may model the different network connectivity relationships from graphs 201 and 203 and the physical location relationships from graph 205 in a single graph to simplify the identification and/or selection of nodes that satisfy multiple constraints defined for desired node network connectivity and physical locations. In other words, controller 100 may perform a single query of graph 217 to identify one or more nodes that satisfy multiple constraints as opposed to individually querying graphs 201, 203, and 205 and combining the results from each query to identify the one or more nodes that satisfy the multiple constraints.

Figure 3:
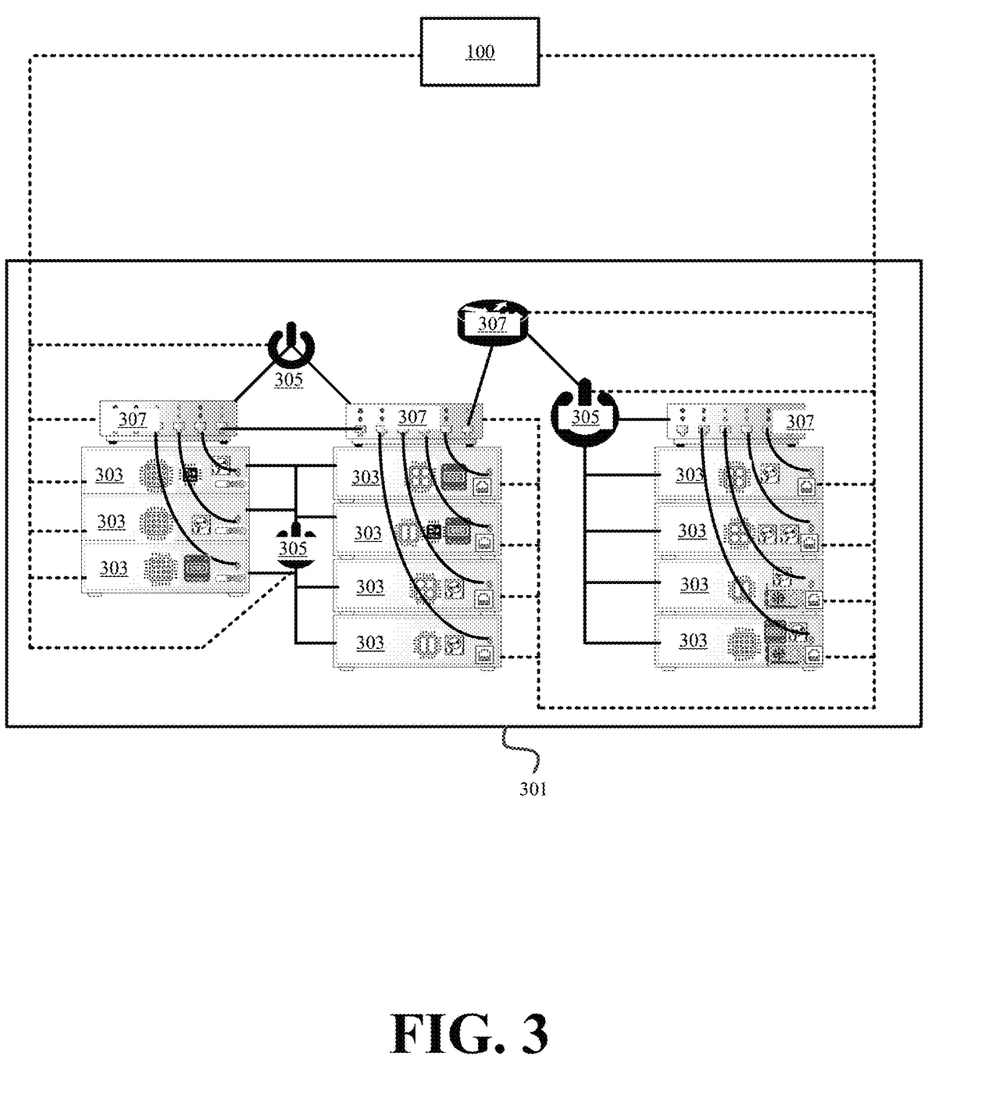
FIG. 3 illustrates example components of a node cluster that a controller may access when performing the relationship graph generation in accordance with some embodiments presented herein.

FIG. 3 illustrates example components of node cluster 301 that controller 100 may access when performing the relationship graph generation in accordance with some embodiments presented herein. Node cluster 301 may include one or more nodes 303, PDUs 305, networking equipment 307, and/or other remotely accessible devices that control, measure, and/or establish different relationships between the nodes and/or node resources.

Each node 303 may include different resources that may be used to run different applications. A controller agent may execute on each node 303 and/or a set of nodes 303 in order to manage the allocation of resources from that node 303 and/or set of nodes 303. In some embodiments, the controller agent may include a software module or service that scans a node 303 for available resources. The controller agent may periodically report the detected resources to controller 100, and controller 100 may generate one or more graphs that map the resources available on each node 303. The controller agent may also manage and/or control the resource allocation in concert with controller 100. For instance, the controller agent may reserve a set of resources for a particular application, may receive the particular application from controller 100, and may install, configure, and/or execute the particular application on the reserved set of resources.

Controller 100 may generate one or more relationship graphs based on the resources identified by each controller agent. For instance, controller 100 may generate a first graph that identifies interrelated nodes 303 that may be used to execute x86 applications, and a second graph that identifies interrelated nodes 303 that may be used to execute ARM applications. Similarly, controller 100 may generate a first graph for a first set of low-cost nodes 303 that have slower memory and slower magnetic disk storage, and a second graph for a second set of high-cost nodes 303 that have faster memory and faster solid-state storage. Other relationships that may be mapped based on the resources information compiled from the controller agents may include graphs that identify nodes with GPUs, processors for specialized tasks (e.g., artificial intelligence, machine learning, audio processing, video processing, etc.), large-scale tasks (e.g., nodes with processor core counts and memory in excess of specified thresholds), and/or other groupings of resources for different software deployments, requirements, and/or allocations.

Nodes 303 may be organized into different groups. In some embodiments, the same nodes 303 may be part of different groups. In some embodiments, the groupings may identify one or more relationships between nodes 303.

In some embodiments, a group of nodes 303 may be defined by their physical proximity or location to one another. For instance, a rack may define a group of nodes 303 that are physically located next to one another, and the positional relationship may be detected via a remotely accessible switch, hub, serial concentrator, and/or other networking equipment 307 of the rack. Specifically, each node 303 in the rack may be connected to a local instance of networking equipment 307. Controller 100 may be configured with the addressing of networking equipment 307, may discover networking equipment 307, and/or may query networking equipment 307 to identify the MAC addressing and/or other identifiers for all nodes 303 connected to the rack. Controller 100 may generate a graph that maps the set of nodes 303 within each rack to a root element in the graph that represents that rack. For further specificity as to the relative positioning of nodes 303 in the rack (e.g., which node 303 is next to which other node 303), communication latency between nodes 303, port connectivity, signal attenuation, wireless signal measurements, and/or other means of determining specific node positions within the rack or group may be used. For instance, controller 100 may identify the set of nodes 303 within a rack based on the identifying information obtained from the rack networking equipment 307. Controller 100 may then instruct the controller agent on each node 303 of the set of nodes 303 to ping all other nodes 303 in the same rack and determine the latency associated with pinging the other nodes 303. The pings may be sent wirelessly via a Bluetooth or WiFi transceiver. Smaller ping times may indicate nodes 303 that are closer. In some embodiments, the nodes 303 may include wired connections that daisy-chain each node 303 to at least one other neighboring node 303. From these direct connections, controller 100 may map the physical locations of each node 303 in a rack or group of nodes 303. In some embodiments, nodes 303 may include a positional sensor (e.g., altimeter, Global Positioning System module, etc.) from which the node positioning within a rack may be determined.

In some embodiments, controller 100 may determine the relative positioning of different racks or groups of nodes 303 based on information compiled from a site router and/or other networking equipment 307 that the rack switches or networking equipment 307 are connected to. Controller 100 may query the addressing tables of the site networking equipment 307 in order to identify each of the racks or groups of nodes 303 within node cluster 301. Controller 100 may then query the addressing table of networking equipment 307 associated with each rack or group of nodes 303 in order to discover the individual nodes 303 within each rack or group of nodes 303. In some embodiments, controller 100 may determine the position of each rack or group of nodes 303 relative to other racks or groups of nodes 303 based on the communication latency between the racks or groups of nodes 303, connectivity of different racks or groups of nodes 303 to the site networking equipment 307, signal attenuation, wireless signal measurements, and/or other means of determining specific rack or groups of nodes 303 positions within node cluster 301.

In some embodiments, controller 100 may map network failure domains based on information compiled from networking equipment 307. For instance, controller 100 may instruct networking equipment 307 to disable certain ports, may detect which nodes 303 are affected by the disabled port, and may map the affected nodes 303 to different network failure domains.

In some embodiments, controller 100 may map network fabric domains using networking equipment 307. In some such embodiments, controller 100 may query networking equipment 307 to determine the physical interface associated with different ports. For instance, networking equipment 307 may include one or more Ethernet ports, InfiniBand ports, and/or ports for other physical interfaces. Controller 100 may determine the nodes 303 that are accessible via each of the different physical interface ports, and may generate one or more network fabric domain graphs that identify the nodes 303 that are connected via the different interfaces. Additionally, controller 100 may measure performance of each network fabric domain and associate the measured performance to each graph. Controller 100 may reference the network fabric domain graphs in order to optimize the allocation of software to nodes 303 where a certain level of network performance is required, to allocate nodes 303 that are connected via a specific network interface requested in a particular resource definition, and/or to allocate nodes 303 according to a cost parameter (e.g., Ethernet-connected nodes cost less than InfiniBand-connected nodes).

In some embodiments, a group of nodes 303 may be defined based on the power domain or failure domain to which each node is connected. In some such embodiments, controller 100 may be configured with the addressing and/or may discover the one or more PDUs 305 that control the power supplied to each node 303. Controller 100 may instruct each PDU 305 to cycle power on each of its power outputs, may detect which nodes 303 are affected by the power disruption (e.g., detect a communication or connection loss with controller agents associated with different nodes 303), and may define a power domain or failure domain to include the set of nodes 303 that were impacted by the power disruption from each of the PDUs outputs. Controller 100 may generate a map to identify the set of nodes 303 associated with each power domain or failure domain.

Node cluster 301 may include other remotely accessible devices that are not shown in FIG. 3 and that controller 100 may communicate with in order to map other relationships between nodes 303 and/or node resources. Additionally, controller 100 may use various tools that are not part of the remotely accessible devices to map additional relationships that controller 100 uses in optimizing a software allocation for performance, reliability, cost, security, efficiency, and/or other factors.

Figure 4:
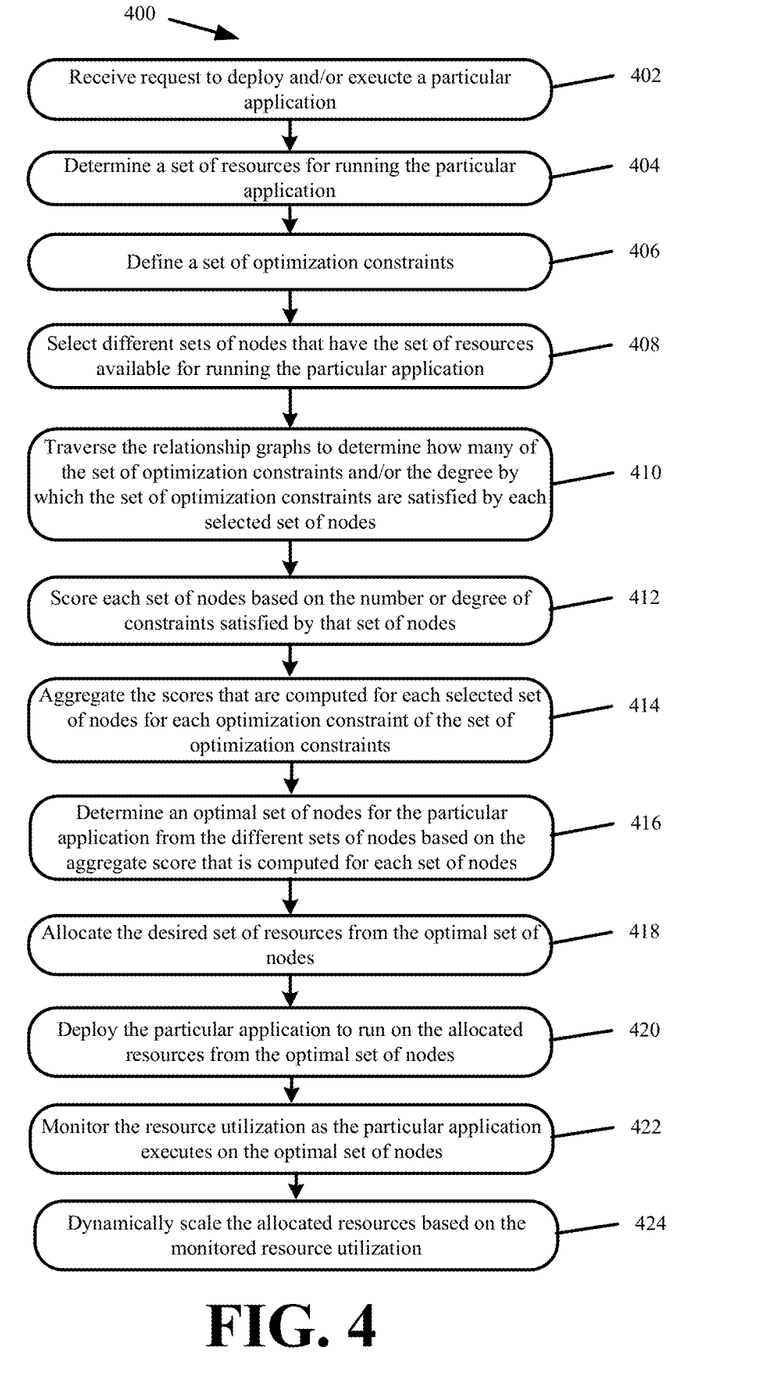
FIG. 4 presents a process for optimizing an allocation of node resources to run a particular application based on mapped resource relationships in accordance with some embodiments presented herein.

FIG. 4 presents a process 400 for optimizing an allocation of node resources to run a particular application based on mapped resource relationships in accordance with some embodiments presented herein. Process 400 may be implemented by controller 100 that manages and/or controls software deployments across different node clusters.

Process 400 may include receiving (at 402) a request for deployment and/or execution of the particular application. The particular application may be defined as one or more containers, software images, services, functions, Application Programming Interfaces ("APIs"), virtual machines, scripts, data, code, binaries, executables, and/or other software. The request may include the one or more software components that form the particular application, or may include a manifest or other definition with links to where the software components may be downloaded and/or accessed. In some embodiments, the request may include or be associated with a resource definition. The resource definition may specify a desired set of resources for executing the particular application. The desired set of resources may include a minimum set of resources required for the particular application to run, and/or a preferred set of resources for executing the particular application with a particular level of performance. The request may be issued as a HyperText Transfer Protocol ("HTTP") message and/or messages of other network protocols.

Process 400 may include determining (at 404) a set of resources for running the particular application. In some embodiments, controller 100 may define the set of resources to match the desired set of resources specified within the resource definition of the request. Should the request not include a resource definition, controller 100 may define the set of resources based on the application type and/or a subscribed or purchased plan. Controller 100 may inspect the application name, extension, and/or manifest to determine various application requirements such as the architecture needed to run the particular application. Similarly, controller 100 may determine the size of the particular application as an indication of the number of resources needed to run the particular application. In some embodiments, controller 100 may perform a lookup of the particular application or its various modules and/or components to identify previously tracked resource usage associated with the particular application or its various modules and/or components. In some embodiments, controller 100 may determine the set of resources from allowed resources that the requesting user is permitted to access based on a subscribed or purchased plan. For instance, the user may subscribe to or purchase a plan that permits the user access to 16 processor cores, 16 gigabytes of memory, two GPUs, 100 gigabytes of storage, and/or other resources. If the user has yet to use any of the permitted resources, controller 100 may select all or a subset of the permitted resources as the set of resources to be allocated for running the particular application.

Process 400 may include defining (at 406) a set of optimization constraints. The set of optimization constraints may include performance, reliability, cost, security, efficiency, and/or other constraints. The definition (at 406) of the set of optimization constraints may be based on preferences and/or rules set by the user requesting the application, preferences and/or rules set for the particular application, and/or preferences and/or rules set by controller 100 or different node clusters for the deployment of various applications.

A performance constraint may specify that all processor cores allocated for an application should be from nodes in the same rack or nodes that are in two racks located directly next to each other. Another performance constraint may include restricting the allocation of processor cores to include processor cores on the same node or a directly adjacent node as an allocated GPU resource so as to reduce delay in data passing between the GPU resource and the processor cores.

Reliability constraints may include preferences and/or rules to allocate different instances of the same application or different components of the same application to different failure domains (e.g., power domains, network domains, etc.) that may be defined with different granularity. For instance, a first power domain may be defined for a power failure that affects a particular rack in a node cluster, and a second power domain may be defined for a power failure that affects the entire node cluster.

A cost constraint specified for the particular application may include allocating the particular application to high-performance and high-cost resources (e.g., newest generation processors, DDR5 or newer memory modules, Non-Volatile Memory Express ("NVMe") storage devices, fiber optic network connections, etc.), to low-performance and low-cost resources (e.g., older generation processors, DDR4 or older memory modules, magnetic disk storage devices, Ethernet network connections, etc.), or to some subset of resources that are selected according to the cost associated with running the particular application on those resources. The cost parameter may be defined for the particular application being deployed, applications of a particular type (e.g., video streaming applications versus e-commerce applications), and/or applications requested by a user that has purchased or subscribed to a specific cost plan.

A security constraint specified for the particular application may include allocating the particular node to nodes that do not execute or host certain types of applications (e.g., applications with a high risk of network attacks) or applications from certain users (e.g., users that are frequent targets of network attacks). Controller 100 may generate one or more graphs to map the number of attacks experienced by different applications deployed to different nodes and/or differentiate between different sets of nodes with resources that provide encryption and/or different levels of security.

An efficiency constraint specified by a particular user may include using energy efficient resources to run the application of the particular user or allocating the applications of the particular user to node clusters that are powered using renewable energy. Accordingly, controller 100 may generate one or more graphs based on the power source supplied to each node or node cluster, and/or based on the power consumption of the mapped resources.

Process 400 may include selecting (at 408) different sets of nodes that individually or collectively have the set of resources available for running the particular application. In some embodiments, selecting (at 408) the different sets of nodes may include traversing the one or more relationship graphs that map the available node resources, identifying individual nodes that have each resource of the set of resources available, and/or identifying two or more interrelated nodes that combined have each resource of the set of resources available.

In some embodiments, controller 100 may restrict the selection (at 408) of the different sets of nodes to include resources from nodes that are located in specific node clusters. For instance, controller 100 may predict the one or more geographic regions where the particular application will be most frequently accessed and/or requested. In some embodiments, controller 100 may monitor previous running instances of the particular application to determine how and where the particular application is likely to be accessed. In some other embodiments, the user requesting the deployment of the particular application and/or the resource definition accompanying the deployment request may indicate the one or more geographic regions and/or locations for the resources to be used in running the particular application. Controller 100 may then search the node clusters that service and/or that are located in the identified regions for the set of resources to run the particular application.

Process 400 may include traversing (at 410) the relationship graphs to determine how many of the set of optimization constraints and/or the degree by which the set of optimization constraints are satisfied by each selected set of nodes. Traversing (at 410) the relationship graphs may include comparing the modeled resource relationships for the selected set of nodes in the graphs to the set of optimization constraints in order to determine if the resource relationships are similar to or differ from the specified constraints. In some embodiments, controller 100 may dynamically generate a single graph that collectively models the relationship represented by each optimization constraint of the set of optimization constraints. In some such embodiments, controller 100 may perform a traversal of the single graph to identify which of the set of optimization constraints are satisfied by each selected set of nodes.

Process 400 may include scoring (at 412) each selected set of nodes based on the number or degree of constraints satisfied by that selected set of nodes. For example, a first performance constraint that is defined as one of the set of optimization constraints may specify a requirement that each node selected as part of the resource allocation is to be within the same rack. Controller 100 may traverse (at 410) the graph that maps the physical locations of a selected first set of 5 nodes and a selected second set of 3 nodes. Based on the graph traversal, controller 100 may determine that 4 of the 5 nodes from the first set of 5 nodes are in the same rack, and may determine that none of the 3 nodes from the second set of 3 nodes are in the same rack. Accordingly, controller 100 may assign a higher first score (e.g., 8 out of 10) for the selected first set of 5 nodes satisfying the first performance constraint, and may assign a lower second score (e.g., 0 out of 10) for the selected second set of 3 nodes satisfying the first performance constraint. Based on the first and second scores, controller 100 may allocate resources from the first set of 5 nodes to run the particular application over resources from the second set of 3 nodes since the first set of 5 nodes better satisfy the performance constraint than the second set of 3 nodes despite the particular application being spread across more nodes (e.g., 5 nodes instead of 3 nodes). As another example, a second performance constraint that is defined as another one of the set of optimization constraints may specify a preference for the selected nodes to be connected via a high-speed low-latency Infini-Band network fabric. Controller 100 may traverse (at 410) the one or more graphs that map the network interfaces of each node from the selected first set of 5 nodes and the selected second set of 3 nodes, and may determine that 2 of the selected first set of 5 nodes have an InfiniBand interface and that all 3 nodes of the selected set of 3 nodes have the InfiniBand interface. Accordingly, controller 100 may assign a lower third score (e.g., 6 out of 10) for the selected first set of 5 nodes satisfying the second performance constraint, and may assign a higher fourth score (at e.g., 10 out of 10) for the selected second set of 3 nodes satisfying the second performance constraint. Similar scoring (at 412) may be performed for reliability, cost, security, efficiency, and/or other constraints specified as part of the set of optimization constraints.

Process 400 may include aggregating (at 414) the scores that are computed for each selected set of nodes for each optimization constraint of the set of optimization constraints. In some embodiments, the scores for each constraint and/or each node in a selected set of nodes may be added to scores computed for other nodes in the selected set of nodes. In some other embodiments, the scores may be weighted based on a first subset of the set of optimization constraints that are prioritized over a second subset of the set of optimization constraints. For instance, a performance constraint may be weighted more heavily in the aggregate score computation than a cost constraint such that the scoring for the performance constraint has a greater impact on the aggregate score computation than scoring for the cost constraint.

Process 400 may include determining (at 416) an optimal set of nodes for the particular application from the different sets of nodes based on the aggregate score that is computed for each set of nodes. Determining (at 416) the optimal set of nodes may include identifying and selecting the particular set of nodes that satisfies more of the optimization constraints than other sets of nodes providing the same or similar resources for the particular application. Accordingly, controller 100 may determine (at 416) that the optimal set of nodes provides better performance than other sets of nodes for the particular application based on the aggregate score that is computed for one or more performance constraints using the one or more relationship graphs that map and/or model various performance relationships between the nodes in each selected set of nodes, and/or that the optimal set of nodes provides greater reliability and more efficient execution than other sets of nodes for the particular application based on the aggregate score that is computed for one or more reliability constraints and one or more efficiency constraints using the relationship graphs that map and/or model various reliability or efficiency relationships between the nodes in each selected set of nodes.

Process 400 may include allocating (at 418) the desired set of resources from the optimal set of nodes. Controller 100 may issue resource reservation requests to the controller agent of each node in the optimal set of nodes. Each resource reservation request may request an allocation of a different subset of the desired set of resources from each node in the optimal set of nodes. In some embodiments, controller 100 may partition the requested subsets of resources so that interrelated resources remain on a single node in order to minimize inter-node communication and/or delay.

The controller agents may respond with a confirmation message that the resources are available and have been reserved for the particular application, or with a rejection message that the resources cannot be allocated to the particular application. In response to one or more rejection messages, controller 100 may reissue the resource reservation requests to one or more substitute nodes that have the subset of resources requested from the nodes providing the rejection messages, and/or that satisfy one or more of the set of optimization constraints. Alternatively, in response to one or more rejection messages, controller 100 may select a next or second optimal set of nodes as determined from the aggregate score that is computed for each set of nodes, and may issue the resource reservation requests to each node in the next or second optimal set of nodes.

Process 400 may include deploying (at 420) the particular application to run on the allocated resources from the optimal set of nodes. Controller 100 may deploy (at 420) different software components of the particular application or redundant instances of the same software components from the particular application to the controller agent of each node that provides a confirmation message to controller 100.

The controller agents may install, configure, and execute the received software components using the allocated subset of resources. In some embodiments, the configuration may include connecting or otherwise communicably coupling the optimal set of nodes so that the different nodes may access data and/or services from one another in order to collectively run one instance of the particular application and/or generate output based on different operations performed by each node of the optimal set of nodes. In some embodiments, the configuration may include running a different instance of the particular application on each node of the optimal set of nodes, and/or distributing user requests for accessing the particular application across the different instances in a manner that balances the particular application load across the optimal set of nodes.

Process 400 may include monitoring (at 422) the resource utilization as the particular application executes on the optimal set of nodes. Controller 100 may receive resource utilization updates from the controller agents managing the optimal set of nodes.

Process 400 may include dynamically scaling (at 424) the allocated resources based on the monitored (at 422) resource utilization. For instance, if demand for the particular application causes the resource utilization to exceed a particular usage threshold, controller 100 may allocate additional resources to the particular application. In some embodiments, controller 100 may request additional resources from the optimal set of nodes. In some other embodiments, controller 100 may identify one or more nodes to join as part of the optimal set of nodes based on the resources of the one or more nodes satisfying the set of optimization constraints used to determine the optimal set of nodes.

Figure 5:
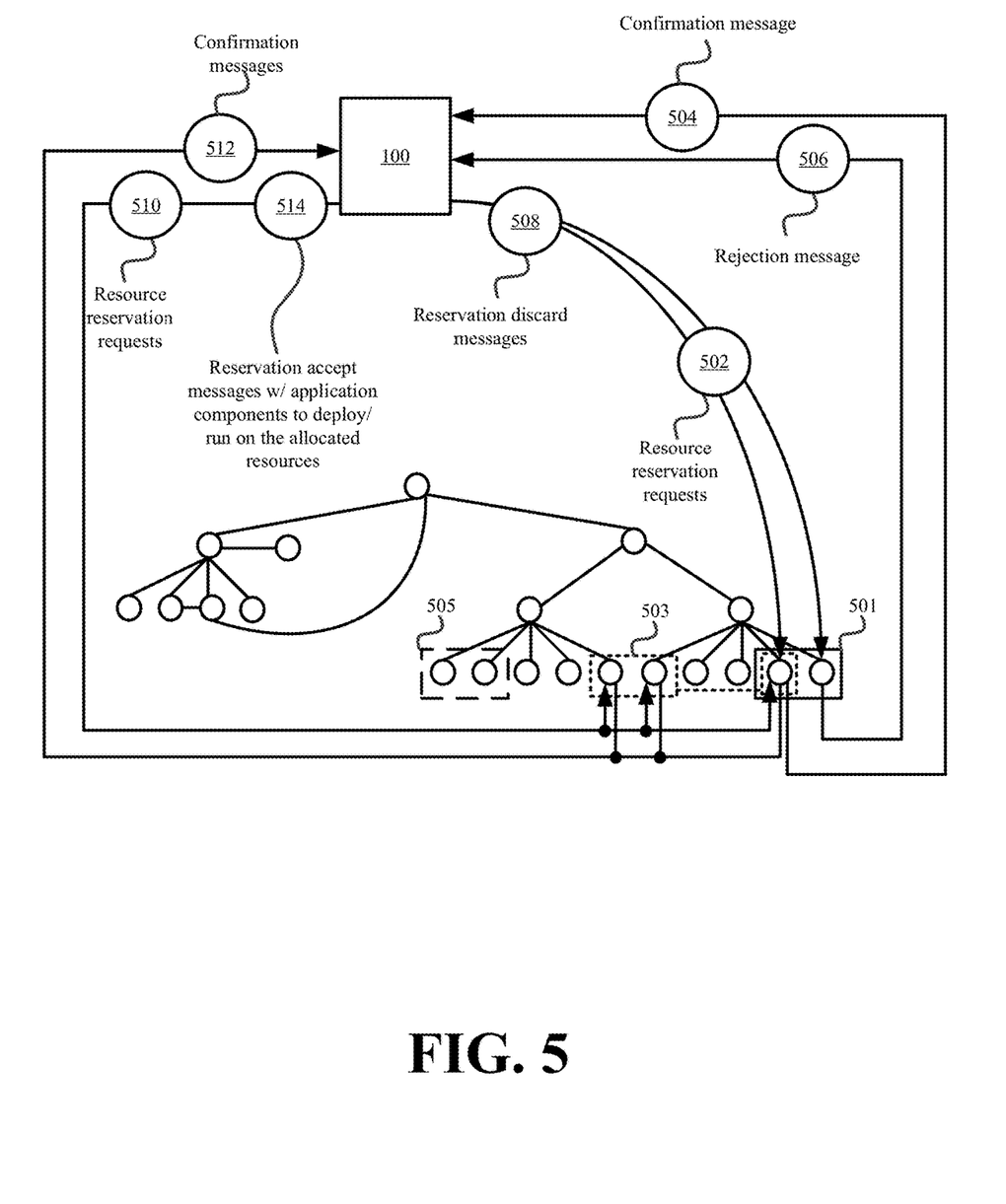
FIG. 5 illustrates a resource allocation and application deployment example in accordance with some embodiments presented herein.

FIG. 5 illustrates a resource allocation and application deployment example in accordance with some embodiments presented herein. Controller 100 may identify different sets of nodes 501, 503, and 505 that contain a desired set of resources for a particular application, and may initially select first set of nodes 501 as the optimal set of nodes that satisfy more optimization constraints set for the particular application, the user of the application, and/or application deployment across the node clusters than other selected sets of nodes 503 and 505. First set of nodes 501 may include two nodes that are located next to one another in the same rack.

Controller 100 may issue (at 502) a resource reservation request for some or all of the desired set of resources to each of the two nodes in first set of nodes 501. A controller agent for each node of first set of nodes 501 may receive (at 502) the resource reservation request from controller 100, and may determine whether the requested resources are available for allocation to the particular application.

The controller agent for a first node of first set of nodes 501 may successfully reserve the requested resources, and may send (at 504) a confirmation message to controller 100. However, the controller agent for a second node of first set of nodes 501 may be unable to reserve the requested resources. The requested resources may have been allocated to another application or may be unavailable for another reason at the time of the resource reservation request. Accordingly, the second node may send (at 506) a rejection message to controller 100.

In response to the confirmation message from the first node and the rejection message from the second node, controller 100 may determine that first set of nodes 501 cannot provide the desired set of resources for the particular application. Accordingly, controller 100 may issue (at 508) a reservation discard message to the first node and the second node so that the requested resources are not reserved and/or allocated for the particular application. The controller agent of the first node may receive the reservation discard message, and may free the resources that were temporarily reserved for the particular application.

Controller 100 may select second set of nodes 503 from the different sets of node as a substitute set of optimal nodes. Specifically, controller 100 may select second set of nodes 503 based on the optimization constraint scoring for second set of nodes 503 being greater than the optimization constraint scoring for all other sets of nodes except for first set of nodes 501 (e.g., third set of nodes 505). In other words, controller 100 may determine based on the graph traversals that second set of nodes 503 contain the relationships that satisfy more of the set of optimization constraints specified for the particular application than third set of nodes 505 from the different sets of nodes that contain the desired set of resources for the particular application. Second set of nodes 503 may include three nodes in two neighboring racks of the node cluster and the first node from first set of nodes 501. Accordingly, second set of nodes 503 may include two nodes as substitutes for the second node from first set of nodes 501 that replied (at 506) with the rejection message, wherein the two substitute nodes may contain the same or similar resources as the second node from first set of nodes 501.

Controller 100 may issue (at 510) a resource reservation request for some or all of the desired set of resources to each of the three nodes in second set of nodes 503. A controller agent for each node of second set of nodes 503 may receive (at 510) the resource reservation request from controller 100, and may attempt to allocate the requested resources for the particular application.

As shown in FIG. 5, each controller agent of second set of nodes 503 may successfully reserve the requested resources, and may send (at 512) a confirmation message to controller 100. Upon receiving (at 512) the confirmation message from all nodes in the second set of nodes, controller 100 may determine that the particular application may be successfully deployed and run using allocated resources from the second set of nodes. Accordingly, controller 100 may issue (at 514) a reservation accept message to the controller agents of the second set of nodes. The reservation accept message may include the software components of the particular application that are to be deployed and run from each node of the second set of nodes.

In response to the reservation accept message, each controller agent of second set of nodes 503 may allocate the requested subset of resources or all of the desired set of resources for exclusive use by the particular application, and may install, configure, and run the particular application software components provided (at 514) by controller 100 on the allocated resources. In some embodiments, each node of second set of nodes 503 may execute a different instance of the particular application. In some embodiments, second set of nodes 503 may collectively execute the particular application with each node performing a different set of operations and/or executing different software components of the particular application and with the outputs from second set of nodes 503 being combined to produce the particular application output for users requesting and/or accessing the particular application.

Figure 6:
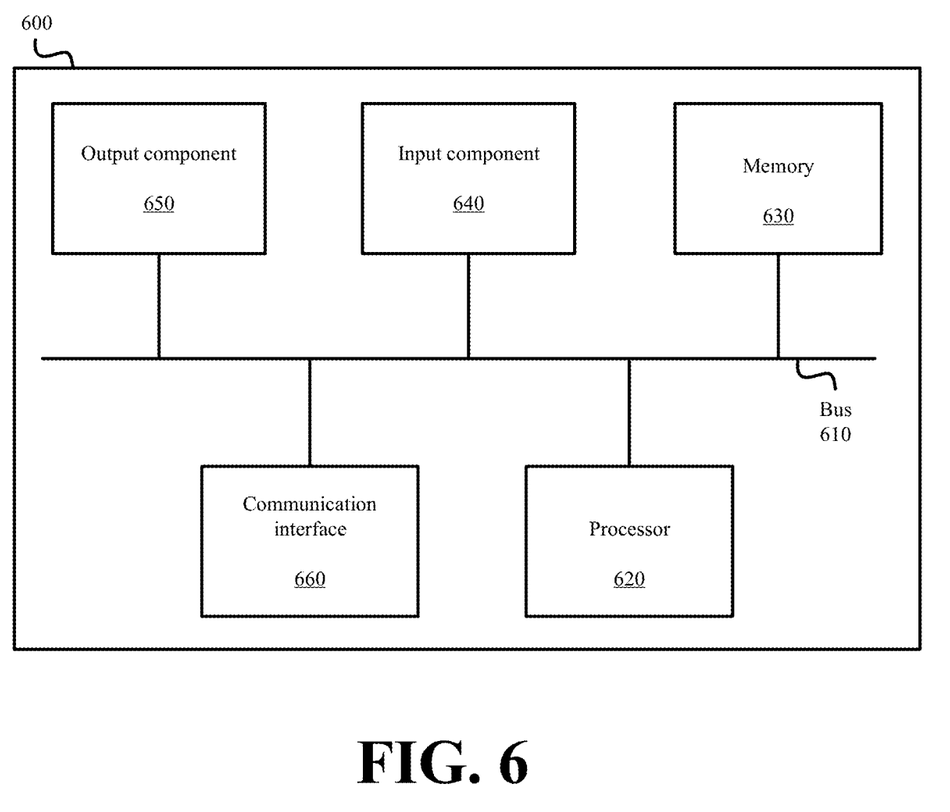
FIG. 6 illustrates example components of one or more devices, according to one or more embodiments described herein.

FIG. 6 is a diagram of example components of device 600. Device 600 may be used to implement one or more of the devices or systems described above (e.g., controller 100, the controller agents, the nodes, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
mapping relationships between resources of a plurality of nodes;
generating a graph with a plurality of vertices that arrange the plurality of nodes into different groups based on the mapping of the relationships between the resources of the plurality of nodes, wherein generating the graph comprises connecting a first set of elements to the graph with a first set of vertices based on a common first relationship between the resources of a first set of the plurality of nodes, and connecting a second set of elements to the graph with a second set of vertices based on a common second relationship between the resources of a second set of the plurality of nodes, and wherein the common first relationship is different than the common second relationship;
receiving a request to run a particular application;
determining different sets of the plurality of nodes that each comprise a particular set of resources for running the particular application;
determining a set of optimization constraints associated with running the particular application;
traversing the graph based on different vertices of the plurality of vertices satisfying different constraints of the set of optimization constraints;
selecting a particular set of nodes from the different sets of nodes based on said traversing ending at a group comprising one or more of the particular set of nodes, wherein the relationships between the resources of the particular set of nodes satisfy more of the set of optimization constraints than the relationships between the resources of other sets of nodes from the different sets of nodes; and
executing the particular application using the resources of the particular set of nodes.

2. The method of claim 1, wherein generating the graph further comprises:
defining each vertex of the plurality of vertices based on a physical location of each node relative to a physical location of other nodes of the plurality of nodes.

3. The method of claim 2,
wherein the set of optimization constraints comprises a performance constraint for running the particular application from two or more nodes that are directly adjacent to one another, and
wherein selecting the particular set of nodes comprises:
determining that the second set of nodes comprises the particular set of resources for running the particular application; and
traversing the graph to the second set of elements with the second set of vertices mapping the second set of nodes as being directly adjacent to one another.

4. The method of claim 1, wherein generating the graph further comprises:
determining which sets of the different sets of nodes are within different failure domains; and
defining the plurality of vertices to arrange elements representing the plurality of nodes according to the different failure domains.

5. The method of claim 4,
wherein the set of optimization constraints comprises a reliability constraint for running the particular application from at least two failure domains of the different failure domains, and
wherein selecting the particular set of nodes comprises selecting one set of nodes from the different sets of nodes that comprises at least a first node in a first failure domain of the at least two failure domains based on a traversal of a first vertex of the plurality of vertices in the graph that leads to a first element representing the first node, and a second node in a second failure domain of the at least two failure domains based on a traversal of a second vertex of the plurality of vertices in the graph that leads to a second element representing the second node, and wherein each of the first node and the second node comprises the particular set of resources for running the particular application.

6. The method of claim 1,
wherein the set of optimization constraints comprises two or more of a first constraint defining a performance requirement associated with running the particular application, a second constraint defining a reliability requirement associated with running the particular application, a third constraint defining a cost requirement associated with running the particular application, a fourth constraint defining a security requirement associated with running the particular application, and a fifth constraint defining an efficiency requirement associated with running the particular application, and
wherein selecting the particular set of nodes comprises scoring each selected set of nodes from the different sets of nodes based on a degree with which each node from the selected set of nodes satisfies the set of optimization constraints.

7. The method of claim 1 further comprising:
allocating a subset of the resources from the particular set of nodes, wherein the subset of resources comprises the particular set of resources for running the particular application; and
deploying software components of the particular application to the particular set of nodes.

8. The method of claim 1 further comprising:
issuing a resource reservation message to each node of the particular set of nodes, wherein each resource reservation message requests an allocation for part or all of the particular set of resources from a different node of the particular set of nodes; and
deploying the particular application to the particular set of nodes in response to receiving a confirmation message in response to each resource reservation message issued to each node of the particular set of nodes.

9. The method of claim 1, wherein mapping the relationships comprises:
exchanging a first set of messages with one or more networking equipment that connect the plurality of nodes to one or more networks; and
determining one or more of different network domains or network interfaces associated with each node of the plurality of nodes based on the first set of messages.

10. The method of claim 9, wherein generating the graph further comprises:
determining an arrangement of the plurality of nodes based on the first set of messages; and
defining the plurality of vertices to arrange elements representing the plurality of nodes according to the different network domains or the network interfaces.

11. The method of claim 9, wherein mapping the relationships further comprises:
exchanging a second set of messages with one or more Power Distribution Units ("PDUs") that supply power to the plurality of nodes; and assigning different nodes of the plurality of nodes to different failure domains based on the second set of messages.

12. The method of claim 1, wherein generating the graph further comprises:
defining the plurality of vertices that connect elements of the graph based on two or more of performance relationships, reliability relationships, security relationships, and cost relationships between the resources of the plurality of nodes.

13. A system comprising:
a plurality of nodes, each node of the plurality of nodes comprises resources that are available for executing different applications; and
a controller comprising one or more processors configured to:
map relationships between the resources of the plurality of nodes;
generate a graph with a plurality of vertices that arrange the plurality of nodes into different groups based on the mapping of the relationships between the resources of the plurality of nodes, wherein generating the graph comprises connecting a first set of elements to the graph with a first set of vertices based on a common first relationship between the resources of a first set of the plurality of nodes, and connecting a second set of elements to the graph with a second set of vertices based on a common second relationship between the resources of a second set of the plurality of nodes, and wherein the common first relationship is different than the common second relationship;
receive a request to run a particular application;
determine different sets of the plurality of nodes that each comprise a particular set of resources for running the particular application;
determine a set of optimization constraints associated with running the particular application;
traverse the graph based on different vertices of the plurality of vertices satisfying different constraints of the set of optimization constraints;
select a particular set of nodes from the different sets of nodes based on said traversing ending at a group comprising one or more of the particular set of nodes, wherein the relationships between the resources of the particular set of nodes satisfy more of the set of optimization constraints than the relationships between the resources of other sets of nodes from the different sets of nodes; and
execute the particular application using the resources of the particular set of nodes.

14. The system of claim 13 further comprising:
a plurality of controller agents, wherein each controller agent of the plurality of controller agents runs on a different node of the plurality of nodes; and
wherein the one or more processors are further configured to determine allocatable resources of each node of the plurality of nodes based on messaging exchanged with the plurality of controller agents.

15. The system of claim 14 further comprising:
networking equipment that connect the plurality of nodes to one or more networks; and
wherein the one or more processors are further configured to determine one or more of different network domains or network interfaces associated with each node of the plurality of nodes based on messages exchanged with the networking equipment.

16. The system of claim 14 further comprising:
one or more Power Distribution Units ("PDUs") that supply power to the plurality of nodes; and
wherein the one or more processors are further configured to assign different nodes of the plurality of nodes to different failure domains based on messages exchanged with the one or more PDUs.

17. A non-transitory computer-readable medium, storing a plurality of processor-executable instructions to:
map relationships between resources of a plurality of nodes;
generate a graph with a plurality of vertices that arrange the plurality of nodes into different groups based on the mapping of the relationships between the resources of the plurality of nodes, wherein generating the graph comprises connecting a first set of elements to the graph with a first set of vertices based on a common first relationship between the resources of a first set of the plurality of nodes, and connecting a second set of elements to the graph with a second set of vertices based on a common second relationship between the resources of a second set of the plurality of nodes, and wherein the common first relationship is different than the common second relationship;
receive a request to run a particular application;
determine different sets of the plurality of nodes that each comprise a particular set of resources for running the particular application;
determine a set of optimization constraints associated with running the particular application;
traverse the graph based on different vertices of the plurality of vertices satisfying different constraints of the set of optimization constraints;
select a particular set of nodes from the different sets of nodes based on said traversing ending at a group comprising one or more of the particular set of nodes, wherein the relationships between the resources of the particular set of nodes satisfy more of the set of optimization constraints than the relationships between the resources of other sets of nodes from the different sets of nodes; and
execute the particular application using the resources of the particular set of nodes.

18. The method of claim 1, wherein generating the graph further comprises:
defining each vertex of the plurality of vertices based on a number of network devices separating each node from other nodes of the plurality of nodes.

19. The method of claim 1, wherein generating the graph further comprises:
defining the plurality of vertices based on different network fabrics or network interfaces used to connect each node of the plurality of nodes to a network.

20. The method of claim 1, wherein generating the graph further comprises:
defining each vertex of the plurality of vertices to model connectivity between different nodes of the plurality of nodes.

21. The method of claim 1, wherein generating the graph further comprises:
defining the plurality of vertices based on the resources of the different sets of nodes belonging to different Non-Uniform Memory Access ("NUMA") domains.

22. The method of claim 1, wherein generating the graph further comprises:

defining the plurality of vertices based on different costs associated with using the resources of different nodes from the plurality of nodes.

23. The method of claim 1, wherein generating the graph further comprises:
defining the plurality of vertices based on numbers or types of network attacks experienced by nodes from the plurality of nodes.

24. The method of claim 1, wherein each element of the graph is associated with an identifier that uniquely identifies a different node of the plurality of nodes, and wherein each vertex to a particular element of the graph represents a different relationship that is present within the resources of a node represented by that particular element.

* * * * *